Oct. 4, 1932.  E. C. ERICKSON  1,880,942
PHOTOGRAPHIC RECORDER
Filed July 7, 1930
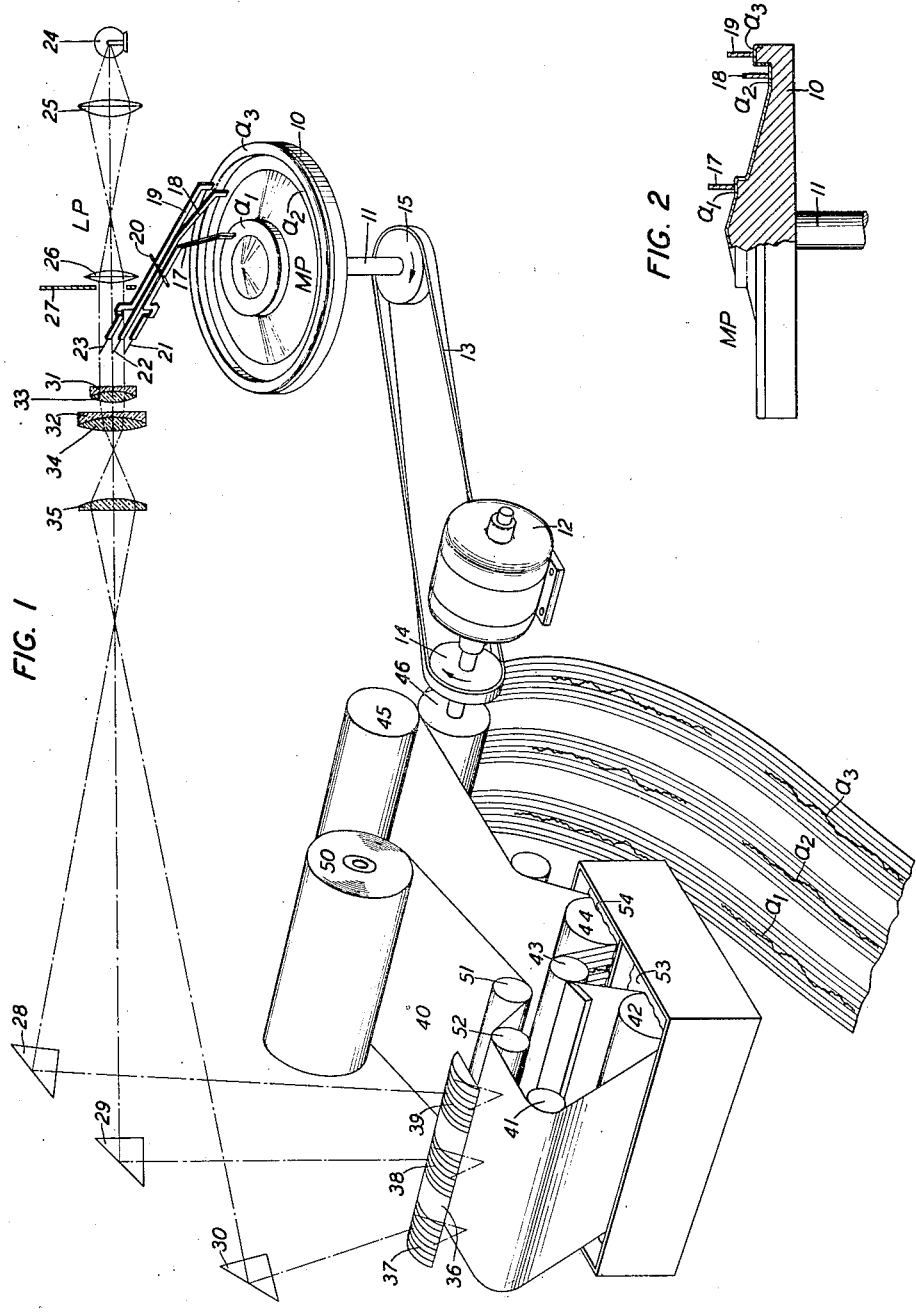
INVENTOR
E. C. ERICKSON
BY J. MacDonald
ATTORNEY Patented Oct. 4, 1932

1,880,942

UNITED STATES PATENT OFFICE

ELMER C. ERICKSON, OF WOODRIDGE, NEW JERSEY, ASSIGNOR TO BELL TELEPHONE LABORATORIES, INCORPORATED, OF NEW YORK, N. Y., A CORPORATION OF NEW YORK

PHOTOGRAPHIC RECORDER

Application filed July 7, 1930. Serial No. 466,085.

This invention relates to photographic recorders.

The object of this invention is to provide a machine of this character which will be simple, cheap to manufacture, convenient in use and wherein the flatness of and the parallelism between surfaces in a machine part are accurately and rapidly measured and recorded.

According to this invention, a machine part having a number of surfaces, the flatness and the parallelism of which are to be measured, is placed on a movable supporting table arranged to be actuated by a motor. A number of oscillating levers which are mounted on a stationary bracket adjacent the table, have their arms resting on respective surfaces of the part under measurement and on the other ends of these levers are mounted short pieces of fine wire or hair lines which extend into the field of a light projector and are magnified through a compound microscope. The images of these hair lines are projected onto respective right angled prisms placed at a certain distance from the microscope and thence onto an oblong shaped lens of semi-circular cross-section under which a tape of photographic paper passes. The oblong lens is divided into groups of equally spaced lines, each space representing a fraction of an inch on which the images of the hair lines are adapted to move according to the degree of deviation in the parallelism of the surfaces and the degree of flatness of these surfaces. A mechanism is provided for actuating the supporting table and the part carried thereby in synchronism with the photographic tape. The operation of the levers through the irregularities of the surfaces and the inaccuracies in the parallelism of these surfaces as determined by the movements of the levers are recorded on the photographic tape which is then passed into the developing and fixing solution placed in containers adjacent the oblong lens from which it emerges a complete graphic record of the condition of the surfaces of the part under measurement.

In the drawing, Fig. 1 is a perspective assembly view of the photographic recorder and Fig. 2 is a detail view of the supporting table showing a diaphragm in position thereon and the levers resting in position on the surfaces, the flatness and parallelism of which are to be measured.

As shown in Fig. 1, the machine part M. P. which, for example, represents a diaphragm having a number of plane surfaces, $a_1$, $a_2$ and $a_3$, the flatness and the parallelism of which are to be measured, is placed on a supporting plate 10, which is mounted at the end of a vertically disposed spindle 11. This spindle and the plate 10 carried thereby are actuated by a motor 12 through a transmission belt 13 passing over the pulley 14 carried by the motor shaft and pulley 15 mounted on the lower end of spindle 11.

As shown in Fig. 2 with the plane surfaces $a_1$, $a_2$ and $a_3$ of the diaphragm are associated the levers 17, 18 and 19. These levers are mounted for pivotal movement on a pin 20. These levers carry at their free end portions the wires 21, 22 and 23 respectively and the other ends of these levers are arranged to rest on their respective surfaces $a_1$, $a_2$ and $a_3$, as by gravity.

The wires 21, 22 and 23 extend in the field of a light projector LP including the lens 24, the condensing lenses 25 and 26 and the iris diaphragm 27. The images of the wires 21, 22 and 23 are projected onto respective right angled prisms 28, 29 and 30 respectively through a compound microscope which includes the pair of planoconcave lenses 31 and 32 and the pair of double concave lenses 33 and 34 and the planoconvex lens 35.

From prisms 28, 29 and 30 the images of wires 21, 22 and 23 are projected onto an oblong lens 36 of semi-circular cross-section. This lens is graduated in groups of spaces 37, 38 and 39, the outer lines in each group of spaces representing the maximum limit of permissible irregularities in the flatness of the surfaces $a_1$, $a_2$ and $a_3$ and the deviation of the parallelism between these surfaces. From the oblong shaped lens 36, the images of wires 21, 22 and 23 are projected onto a photographic film 40 which is mounted on roller 50 and guided under the lens 36 by rollers 51, 52 and 41 from which the tape is led, after exposure directly in the developing and fixing solution, through the cooperation of rollers 42, 43 and 44. The film is actuated through the operation of driving rollers 45 and 46, the latter being operatively connected to the armature shaft of the motor.

In a typical example of operation, the part, the flatness of the surfaces that are to be measured as well as the parallelism between these surfaces, is placed on the movable plate 10 in position as shown in Figs. 1 and 2. The light projector is put in operation and the motor 12 is started. The operation of the motor is effective to actuate spindle 11 and the plate 10 carried thereby and consequently rotating the diaphragm M. P. placed thereon. The movement of the diaphragm is effective to cause the operation of the oscillating levers 17, 18 and 19 an amount proportional to the irregularities and the deviation in the parallelism of the surfaces. The movement of these levers and the wires carried thereby are projected onto the photographic paper by the system of lenses above described and the movement of the film through the operation of the motor is effective to translate each circle of the diaphragm in contact with the levers 17, 18 and 19 into rectilinear measurement as represented by the corresponding graphs $a_1$, $a_2$ and $a_3$ on the photographic film 40 the irregularities in these surfaces as well as the parallelism therebetween being indicated by the lateral deviation of the graphs with respect to the spacing lines.

After printing, the photographic tape passes into the developing and fixing solution in the containers 53 and 54 from which it emerges a complete graphic record of the condition of the surfaces of the parts under measurement.

What is claimed is:

1. The method for measuring the flatness of a surface of a machine part which method consists in actuating a hair line member according to the irregularities in such surface and projecting the image of the hair line onto a moving photographic film.

2. The method for measuring the flatness of a machine part which method consists in actuating the part under test and actuating a hair line member in the field of a light projector according to the irregularities in such surface and projecting the image of such hair line onto a photographic film through a system of lenses, the photographic film being operated in synchronism with the movement of the part under measurement.

3. In a photographic recorder a movable support for receiving the part, the flatness of which is to be measured, an oscillating lever having one end resting on the surface of the part and its other end carrying a hair line member, a continuously moving photographic film, a light projector and a system of lenses for projecting the image of said hair line on said film for recording the movement of said lever.

4. In a photographic recorder for measuring the parallelism between surfaces of a machine part a photographic film, a plurality of oscillating levers actuated by the deviation in the parallelism of the surfaces, each of said levers carrying a hair line, a system of lenses and means for projecting the images of said hair lines on said film for recording the movements of said levers.

5. In a device for measuring the parallelism between surfaces of a machine part, a plurality of oscillating levers actuated by the deviation of the surfaces upon relative movement of the part with respect to said levers and a plurality of cooperating means for simultaneously recording the movements of said levers.

In witness whereof, I hereunto subscribe my name this 3rd day of July, 1930.

ELMER C. ERICKSON.